INVENTOR
MYRON N. PALMER

United States Patent Office 3,500,676
Patented Mar. 17, 1970

3,500,676
METHODS AND APPARATUS FOR DETECTING LEAKS
Myron N. Palmer, Gibsonia, Pa., assignor to Gulf Research & Development Company, Pittsburgh, Pa., a corporation of Delaware
Filed Mar. 15, 1968, Ser. No. 713,482
Int. Cl. G01m 3/08
U.S. Cl. 73—40.5    13 Claims

ABSTRACT OF THE DISCLOSURE

An instrument to detect both the sound of an intra-valve leak which is in the sonic range, and the sound of a leak to atmosphere which is in the ultrasonic range. The instrument is primarily used with pressurized fluid systems. An external touch probe is provided for sonic sounds, another probe is provided for ultrasonic sounds. A tunable amplifier is used so that steady leakage sounds can be distinguished from other extraneous noises, and a frequency divider is utilized to convert ultrasonic vibrations to the audible range.

---

Figure 1:
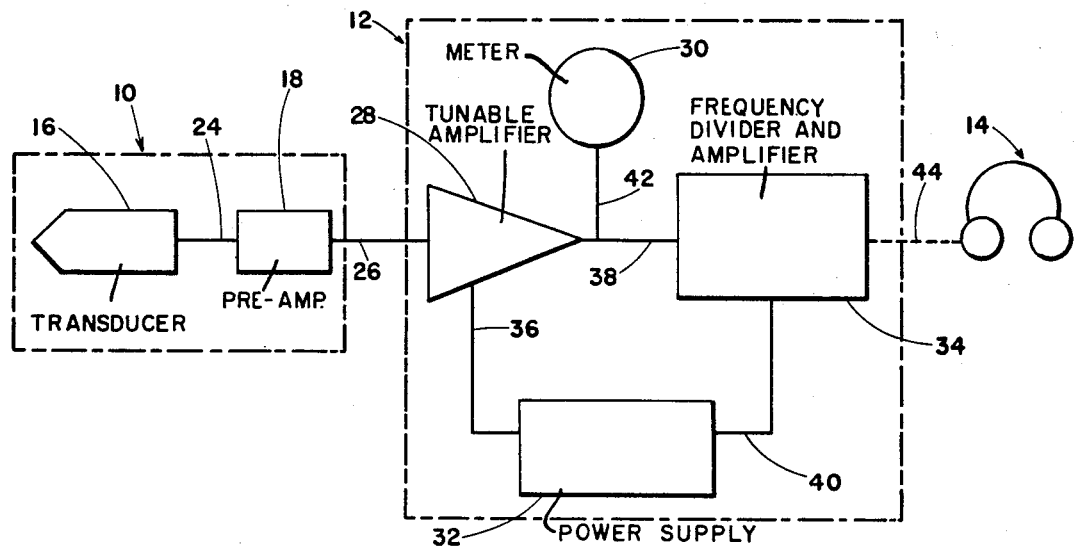

This invention relates to methods and apparatus for detecting leaks. In valves, pipelines and other such fluid handling equipment, leaks are of two general types. A leak can occur intra-valve, or it can occur from the valve to atmosphere around flanges, valve stems, and the like. Each of these leaks has a different set of characteristics, and the invention is useful to detect both types.

More particularly, the invention is adapted to detect relatively small leaks, of both classes, in pressurized fluid handling systems. Large leaks are not difficult to detect because they produce many external indicia, such as failure of flow or stopping of flow, pools or clouds of the fluid around the leak, loud noises, and the like. Small leaks, however, produce no such easily recognizable telltales, and finding them is important because they can, if undetected, develop into large leaks, which depending upon the fluid being handled, can result in expensive product losses and/or severe safety hazards.

Relatively small leaks from a pressurized fluid handling system to atmosphere will produce ultrasonic sounds in the range of 40 kc. The present invention provides apparatus to detect such sounds as an indication of such leaks.

I have found that small intra-valve leaks produce a sound which is steady and which has a frequency in the range of 2 kc. to 20 kc. An intra-valve leak produces sound because of the change in velocity of the fluid as it moves through the leak orifice. The phase, gas, liquid, vapor or combinations, of the fluid will determine the general character of the sound. That is, leaking gases generally produce higher frequency sounds than leaking liquids. The present invention provides apparatus to detect sonic sounds as an indication of intra-valve leaks.

Thus, the invention detects both types of leaks by their characteristic sounds with a single instrument.

In ordinary usage, the word "sound" means that class of mechanical radiant energy which causes hearing. However, as used herein, the word "sound" shall be understood to mean that class of mechanical radiant energy having frequencies in a range of about 2 kc. to about 20 kc. (sonic sounds), as well as those having a frequency of about 40 kc. (ultrasonic "sounds").

Prior devices for detecting leaks from a pressurized fluid handling system to atmosphere also depend upon detecting the characteristic ultrasonic sounds produced by such leaks. However, such prior apparatus and circuitry generally include some means to heterodyne or "beat" the frequency of the detected sound against a known fixed frequency to produce a signal having a frequency equal to the difference in frequencies. The final signal is in the audible range. Such instruments lack the tuning feature of the present invention in the sonic mode. They cannot discern or pick out the sound from the leak and amplify only it, they amplify the entire spectrum of sound detected. It is an object of the present invention to provide a leak detector which, in its ultrasonic mode, will detect leaks and produce an audible sound in response thereto without the need for the relatively complex heterodyne type of circuit.

A more difficult problem is the detection of intra-valve leaks. Prior means required some entry into the pressurized fluid system. For example, tracer materials, i.e., radioactive, color coated, or other types, were inserted upstream from the valve and a leak indicated by their presence downstream from the valve when the valve should be closed. Another prior system involved temperature differential dependent means which detect a velocity downstream from a valve that should be closed. These means may comprise a thermoelectric balanced bridge circuit having an element placed downstream from the valve which indicates the presence of the velocity by the cooling effect the velocity has on the element of the bridge circuit. Such prior methods suffer from the obvious disadvantage that some physical entry into the pressurized system is required, which physical entry is often impractical, always inconvenient, and sometimes impossible and/or dangerous.

The apparatus of the invention utilizes an external touch probe to detect the sound vibrations produced by the intra-valve leak. The invention includes a tunable amplifier which is tuned by the operator through the 2 kc. to 20 kc. range to seek the steady sound produced by such intra-valve leaks. The invention depends for its successful operation on the fact that all other sound vibrations at the valve are either not steady in nature or not of the characteristic frequency, depending on fluid phase, in the range of 2 kc. to 20 kc., that such a fluid should produce. In a valve controlling a pipeline in a refinery for example, a great host of such extraneous sounds will be present. The sources of such sounds include other equipment such as pumps, motors, turbines, partially closed valves, random turbulence and other factors in the overall system. In order for the detector of the invention to be "fooled" by such random noises, they would have to be both steady and of the expected frequency as the leak in the range of 2 kc. to 20 kc. I have found that these conditions are simultaneously met only when there is an intra-valve leak. Field testing has proved the practicability of the apparatus of the invention.

The apparatus of the invention can also be used to detect other peculiarities that are characterized by a sonic frequency. For example, if it is suspected that a turbine or engine has a worn bearing, the apparatus of the invention can be used to seek out that bad part by first "listening" to a properly operating bearing to familiarize the operator with its characteristic sound, and then examining the suspected bearing. If the suspected bearing produces a markedly different frequency, further investigation, such as dis-assembling, is only then warranted.

The apparatus of the invention is a light weight, self-contained, self-powered, easily used, electronic instrument which includes a simple switch to change its mode of operation from ultrasonic for leaks to the atmosphere to sonic for intra-valve leaks. The circuitry includes a common circuit, used in both modes, which is in effect a frequency divided, or countdown of the leak signal. Solid state electronic components are used for their well-known advantages, and this frequency divided circuit comprises an array of four binary flip-flops which together provide a frequency division factor of 16. Thus, the sonic frequencies in the range of 2 kc. to 20 kc. are reduced to much more easily heard frequencies in the range of about 125 c.p.s. to 1250 c.p.s. The ultrasonic leak signals are reduced to an easily heard frequency of about 2500 c.p.s.

Prior ultrasonic leak detectors are not usable to detect intra-valve leaks because they have no means to discriminate or select the sound characteristic of intra-valve leaks. That is, ultrasonic leak detectors cannot, "tune-in" to the weak sonic signal produced by an intra-valve leak, they amplify all frequencies encountered equally.

The invention provides an easily portable, compact, easily used, self-powered, highly reliable instrument which, with the two necessary probes, will detect both ultrasonic and sonic leaks. Prior ultrasonic detectors are relatively expensive instruments and have no capability whatsoever to find intra-valve leaks. Prior methods of detecting intra-valve leaks require some entry into the system, or semi-permanent clamping of sensors to the vessel being tested. The present invention overcomes the problems present in both these prior types of apparatuses, individually, while at the same time providing a combined instrument which successfully, conveniently and economically detects both classes of leaks. To change from one class to the other, the proper probe is attached and one switch moved to the proper mode. The apparatus includes a hand-held touch probe for sonic leaks and a conventional ultrasonic probe for ultrasonic leaks.

Figure 2:
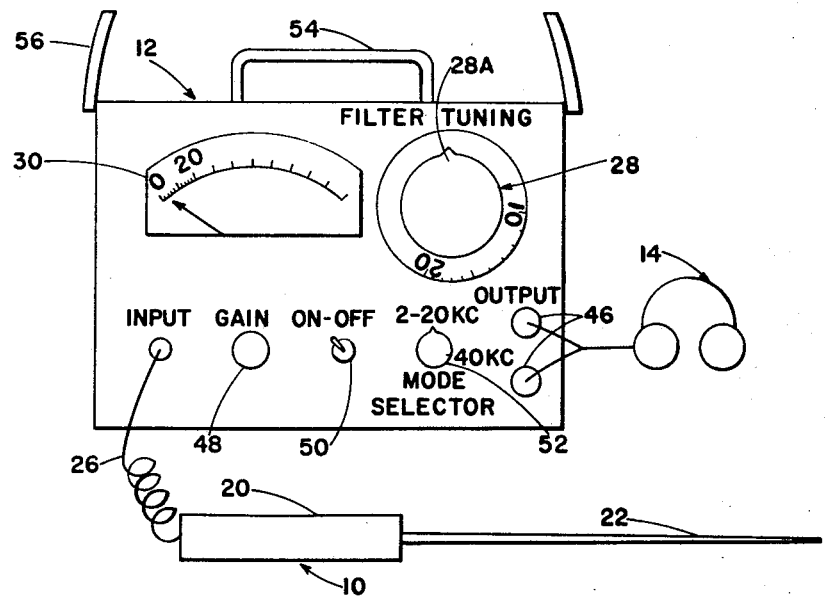

The above and other advantages of the invention will be pointed out or will become evident in the following detailed description and claims, and in the accompanying drawing also forming a part of the disclosure, in which:

FIG. 1 is a block diagram of the circuit of the invention; and FIG. 2 is an elevational view of an instrument embodying the invention.

Referring now in detail to the drawing, 10 designates a probe for use in detecting intra-valve or sonic leaks, and 12 designates a portable instrument for use with probe 10 and a conventional ultrasonic probe, not shown. A pair of headphones 14 may be used by the operator to hear the sound from both types of leaks Probe 10 consists of a crystal transducer 16 which senses the physical vibrations produced in the valve by an intra-valve leak and converts these vibrations to electrical signals having the same frequency as the sound vibrations. Transducer 16 is a commercial accelerometer with a high natural resonant frequency of about 60 kc. The transducing elements consist of two lead xirconium titanate piezoelectric disks which carry a relatively heavy mass pre-loaded by a relatively stiff spring. Other suitable transducers are available and may be used. The crystal transducer used in the successful embodiment of the invention was made by the Brüel and Kjaer Company of Copenhagen, Denmark, and is known as their model No. 4335. Probe 10 also includes a pre-amplifier 18 which strengthens the electrical signal produced by transducer 16 in preparation for feeding it into instrument 12.

Referring to FIG. 2, transducer 16 and amplifier 18 are housed in the hollow handle 20 of probe 10. Probe 10 also includes a thin, realtively stiff touching element 22, and means, not shown, are provided to operatively connect the inner end of touch element 22 to the input side or transducer 16. Element 22 is a threaded metal rod that cooperates with suitably formed mating threads connections between amplifier 18 and transducer 16.

Pre-amplifier 18 may be any one of a number of relatively standard circuits, and is preferably fabricated by the printed circuit technique to minimize the size of handle 20. Line 24 represents the various necessary internal connections between amplifier 18 and transducer 26.

Probe 10 is connected to instrument 12 by a telephone-type retractile cord 26. Cord 26 is provided with a plug-in jack for cooperation with a suitable input socket on instrument 12.

Mounted within the casing of instrument 12 are a tunable amplifier 28, a meter 30, a power supply 32, and an audio frequency countdown and amplifying circuit 34. Line 26 from probe 10 comprises the input of tunable amplifier 28. A line 36 connects amplifier 28 to the power supply 32, which conveniently comprises a battery for ease of replacement and portability. A line 38 connects the output of amplifier 28 to circuit 34, and a line 40 feeds power from power supply 32 to said circuit 34. A line 42 feeds the output of amplifier 28 to meter 30 to give the operator a visual indication of the detection of a leak. A line 44 feeds a pair of output jacks 46 on instrument 12, to which the earphones 14, or any other desirable means, such as an oscilloscope, may be connected. Referring to FIG. 2, instrument 12 includes a gain knob 48, a main on-off switch 50, and a mode selector switch 52. For ease of use, the case has a handle 54 and a shoulder strap 56.

OPERATION

To detect intra-valve leaks, switch 50 is put in the "on" position and mode selector switch 52 is put in the "2–20 kc." mode. Handle 20 of probe 10 is grasped by the operator, and element 22 is touched to the valve being checked, preferably to the valve stem, which has been found to be the most sensitive part of the valve for this purpose. The tunable amplifier tuning knob 28a is moved by the operator over the 2–20 kc. range. Assuming that the valve being checked has an intra-valve leak having a frequency of, for example, 10 kc., the operator will hear no indicative sound in earphones 14 and will see no indicative reading on meter 30 until knob 28a is tuned to about 10 kc. When the instrument is tuned to the frequency of the sound of the leak, a loud whistle-like sound will be heard in earphones 14, and the needle in meter 30 will move to a high value.

When the invention is being used in a "noisy" environment, i.e., where many other extraneous sounds are present around the valve, it is desirable for the operator to note the noise level on both sides of the pipe containing the valve close to the valve. Then, upon measuring sound in the valve, the operator will be more easily able to tune to a leak sound because he is now familiar with the noises. The operator will, of course, know the phase of the fluid, so he knows generally where to expect to find the leak sound in the 2–20 kc. range, i.e., low end for liquids, high end for gases.

The output signal of the tunable amplifier delivered through line 38 to circuit 34 will be filtered therein and amplified. Circuit 34 comprises four binary flip-flops arranged in cascade to divide the frequency of the input signal by a factor of 16. Any other suitable divider circuit, such as a phanastron circuit, could be used for circuit 34, as is well known to those skilled in this art.

Assuming that it is desired to seek a leak to atmosphere which produces an ultrasonic sound, mode selector switch 52 is moved to the "40 kc." mode. Internal connections, not shown, in instrument 12 will cut out tunable amplifier 28 and cut in a built-in, fixed-frequency circuit tuned of about 40 kc., not shown. As mentioned above, substantially all atmospheric leaks that produce an ultrasonic sound will have a frequency sufficiently close to 40 kc. so that the fixed 40 kc. circuit will pick it up. The entire probe is a commercial item available, for example, from the Burnett Electronics Lab, Inc. of San Diego, Calif. their model No. 609400. The output of the fixed frequency 40 kc. circuit is fed through line 38 to circuit 34 wherein its frequency is divided by 16 to reduce it to the audible range to thereby enable the operator to hear it in earphones 14.

In the successful embodiment of the invention, instrument 12 was modified from a standard instrument known as a "Tuned Amplifier and Null Detector" obtained from General Radio of West Concord, Mass., type 1232–A. The modifications of the commercial instrument involved the addition of circuit 34 and modifying the fixed tuned 50 kc. filter to a fixed tuned 40 kc. filter for use in the ultrasonic leak detection mode, and the necessary switching circuitry.

While the invention has been described in detail above, it is to be understood that this detailed description is by way of example only, and the protection granted is to be limited only within the spirit of the invention.

I claim:

1. A method of detecting leaks which are characterized by the production of sonic or ultrasonic sounds comprising the steps of detecting mechanical vibrations produced by the leak, transducing the mechanical vibrations detected into a first signal having a frequency substantially equal to the frequency of the sonic or ultrasonic sound produced by the leak, dividing the frequency of said first signal by a predetermined factor to produce a second signal, amplifying said second signal to produce a third signal having a frequency substantially equal to that of said second signal, and feeding said third signal to indicating means to produce an indication of a sonic or ultrasonic leak discernable to a human being.

2. The method of claim 1, said discernable indication being produced in audible form.

3. The method of claim 1, said discernable indication being produced in visual form.

4. The method of claim 1, wherein said frequency division step is performed by dividing by a predetermined factor of 16.

5. The method of claim 1, wherein said vibrations have a frequency in the sonic range, wherein said vibrations are detected by the step of touching a touch probe to an external surface of the vessel being examined, and wherein said vibrations are transduced by a crystal transducer in said touch probe.

6. The method of claim 1, wherein said vibrations have a frequency in the ultrasonic range, and wherein said vibrations are detected and transduced by means of an ultrasonic probe.

7. Apparatus for detecting leaks comprising means to sense the sonic or ultrasonic sound vibrations produced by the leak, means to convert the vibrations sensed into a first electrical signal having a frequency substantially equal to that of the sonic or ultrasonic sound produced by the leak, means to divide the frequency of said first electrical signal to produce a second electrical signal having a frequency less than the frequency of said first electrical signal and which is in the range of human audibility, means to amplify said second electrical signal, and means to indicate said amplified second electrical signal.

8. The combination of claim 7, said indicating means comprising a set of headphones.

9. The combination of claim 7, said frequency dividing means comprising a plurality of binary flip-flops arranged in cascade.

10. The combination of claim 9, said plurality comprising four binary flip-flops, whereby the frequency of said first signal is divided by a factor of 16.

11. The combination of claim 7, said sensing means comprising a touch probe adapted to sense sound vibrations in the range of about 2 kc. to about 20 kc. said converting means comprising a crystal transducer housed within said touch probe, a pre-amplifier within said touch probe adapted to amplify the signals produced by and a tunable amplifier having a range of about 2 kc. to about 20 kc. in said instrument housing interposed between the output from said touch probe and the input to said frequency dividing means, whereby an operator may tune said tunable amplifier to a sound having a frequency within the range of said tunable amplifier.

12. The combination of claim 11, a retractile cord interconnecting said touch probe and the input of said tunable amplifier.

13. The combination of claim 11, said indicating means comprising a set of headphones.

References Cited

UNITED STATES PATENTS

| | | | |
|---|---|---|---|
| 2,008,934 | 7/1935 | Smith | 73—40.5 |
| 2,884,624 | 4/1959 | Dean et al. | 73—40.5 XR |
| 3,172,042 | 3/1965 | Dawirs | 331—51 XR |
| 3,192,516 | 6/1965 | Simpkins et al. | 73—40.5 XR |
| 3,222,635 | 12/1965 | Simpkins et al. | |
| 3,253,457 | 5/1966 | Pakala et al. | 73—40.5 XR |
| 3,379,897 | 4/1968 | Kaminski | 331—51 XR |
| 3,409,897 | 11/1968 | Bosselaar et al. | 73—40.5 XR |
| 3,422,312 | 1/1969 | Albarda | 321—60 XR |

FOREIGN PATENTS 98,684  8/1961  Netherlands.

OTHER REFERENCES

Product Bulletin 118, Delcon Corporation, Ultrasonic Translator, 4 pages.

S. CLEMENT SWISHER, Primary Examiner

PO-1050
(5/69)

UNITED STATES PATENT OFFICE
CERTIFICATE OF CORRECTION

Patent No. 3,500,676          Dated March 17, 1970

Inventor(s) Myron N. Palmer

It is certified that error appears in the above-identified patent and that said Letters Patent are hereby corrected as shown below:

Column 3, line 47, "xirconium" should be --zirconium--.

Column 3, line 64, after "threads" delete "connections between amplifier 18 and transducer 16" and insert --formed in the input side of transducer 16--.

Column 3, line 70, "26" should be --16--.

Claim 11, line 14, after "by" insert --said crystal transducer, an instrument housing,--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents